(12) United States Patent  
Hoyle

(10) Patent No.: US 9,050,915 B2
(45) Date of Patent: Jun. 9, 2015

(54) VEHICLE SEAT

(75) Inventor: James Brooks Hoyle, Telford (GB)

(73) Assignee: BAE SYSTEMS plc (GB)

( * ) Notice: Subject to any disclaimer, the term of this patent is extended or adjusted under 35 U.S.C. 154(b) by 0 days.

(21) Appl. No.: 13/880,405

(22) PCT Filed: Oct. 13, 2011

(86) PCT No.: PCT/EP2011/067861
§ 371 (c)(1),
(2), (4) Date: Jul. 3, 2013

(87) PCT Pub. No.: WO2012/052343
PCT Pub. Date: Apr. 26, 2012

(65) Prior Publication Data
US 2013/0270877 A1    Oct. 17, 2013

(30) Foreign Application Priority Data

Oct. 19, 2010 (EP) .................................. 10251825
Oct. 19, 2010 (GB) .................................. 1017622.0

(51) Int. Cl.
*B60N 2/427* (2006.01)
*B60N 2/24* (2006.01)
(Continued)

(52) U.S. Cl.
CPC .............. *B60N 2/42709* (2013.01); *B60N 2/24* (2013.01); *B60N 2/3065* (2013.01); *B60N 2/503* (2013.01); *B60N 2/505* (2013.01); *B60N 2/509* (2013.01);
(Continued)

(58) Field of Classification Search
CPC ...... B60N 2/502; B60N 2/2893; B60N 2/501; B60N 2/42709; B60N 2/42745; B60N 2205/30
USPC ................. 296/65.01, 68.1, 65.02; 297/216.1
See application file for complete search history.

(56) References Cited

U.S. PATENT DOCUMENTS 4,632,457 A    12/1986  Hofrichter et al.
5,273,240 A    12/1993  Sharon
(Continued)

FOREIGN PATENT DOCUMENTS

CN    201432596    3/2010
DE    197 01 387 A1    7/1998
(Continued)

OTHER PUBLICATIONS

International Preliminary Report on Patentability (PCT/IB/373 issued on Apr. 23, 2013 by the European Patent Office as the International Searching Authority for International Application No. PCT/EP2011/067861.
(Continued)

*Primary Examiner* — Joseph D Pape
*Assistant Examiner* — Dana Ivey
(74) *Attorney, Agent, or Firm* — Finch & Maloney PLLC

(57) ABSTRACT

A seat for a vehicle is disclosed with a support for attachment to an aspect of a vehicle and a platform block which may be securely attached to the support. A seat element for accommodating an occupant is provided together with a suspension system connecting the seat element to the platform block. The suspension system includes a resilient member having an equilibrium condition to which the resilient member is biased to return if it extends beyond, retracts below or otherwise varies away from the equilibrium condition.

20 Claims, 17 Drawing Sheets

(51) Int. Cl.
*B60N 2/30* (2006.01)
*B60N 2/50* (2006.01)
*B60N 2/54* (2006.01)

(52) U.S. Cl.
CPC .......... *B60N 2/544* (2013.01); *B60N 2002/247* (2013.01)
USPC ...................................... 296/68.1; 297/216.1

(56) References Cited

U.S. PATENT DOCUMENTS

| | | | |
|---|---|---|---|
| 2,758,859 | A | 6/1998 | Gonzalez |
| 6,270,161 | B1 | 8/2001 | DeFilippo |
| 6,655,738 | B2 | 12/2003 | Kammerer |
| 7,300,107 | B2 | 11/2007 | Kammerer |
| 7,413,247 | B2 | 8/2008 | Van Druff et al. |
| 7,744,155 | B2 | 6/2010 | List et al. |
| 8,226,170 | B2 | 7/2012 | Lutzka et al. |
| 8,801,103 | B2 | 8/2014 | Bittinger et al. |
| 2005/0116516 | A1 | 6/2005 | Robinson |
| 2007/0029854 | A1 | 2/2007 | Robinson |
| 2007/0035167 | A1 | 2/2007 | Meyer |
| 2007/0228795 | A1 | 10/2007 | Boehme et al. |
| 2010/0102609 | A1 | 4/2010 | Confer et al. |
| 2010/0230989 | A1* | 9/2010 | Cantor et al. ................. 296/68.1 |
| 2011/0037300 | A1 | 2/2011 | Pettigrew et al. |
| 2012/0001461 | A1 | 1/2012 | Alexander et al. |
| 2013/0200676 | A1 | 8/2013 | Hoyle |
| 2013/0207429 | A1 | 8/2013 | Hoyle |

FOREIGN PATENT DOCUMENTS

| | | |
|---|---|---|
| EP | 1361104 A1 | 11/2003 |
| EP | 1530930 A1 | 5/2005 |
| FR | 2898554 A1 | 9/2007 |
| FR | 2927025 A1 | 8/2009 |
| FR | 2929179 A1 | 10/2009 |
| GB | 2 120 931 A | 12/1983 |
| GB | 2449451 A | 11/2008 |
| JP | 2010006210 A | 1/2010 |
| WO | WO 2009/070884 A1 | 6/2009 |

OTHER PUBLICATIONS

International Search Report (PCT/ISA/210) issued on Mar. 1, 2012, by the Japanese Patent Office as the International Searching Authority for International Application No. PCT/EP2011/067861.
European Search Report issued on Jun. 30, 2011.
United Kingdom Search Report issued on Jan. 20, 2011.
International Report on Patentability and Written Opinion received in PCT Application No. PCT/EP2011/067863, dated Apr. 23, 2013, 7 pages.
International Search Report received in PCT Application No. PCT/EP2011/067863, dated Mar. 1, 2012, 3 pages.
European Search Report received in European Patent Application No. 10251815.6, dated Sep. 6, 2011, 3 pages.
Great Britain Search Report received in Great Britain Patent Application No. 1017678.0, dated Jan. 26, 2011, 3 pages.
International Preliminary Report on Patentability and Written Opinion, received in PCT Application No. PCT/EP2011/067865, dated Apr. 23, 2013, 6 pages.
International Search Report, received in PCT Application No. PCT/EP2011/067865, dated Dec. 19, 2011, 3 pages.
United Kingdom Search Report for GB Application No. GB1017636.0, dated Jan. 21, 2011, 1 page.
European Search Report received in EP Application EP10251824, dated Mar. 3, 2011, 2 pages.

* cited by examiner

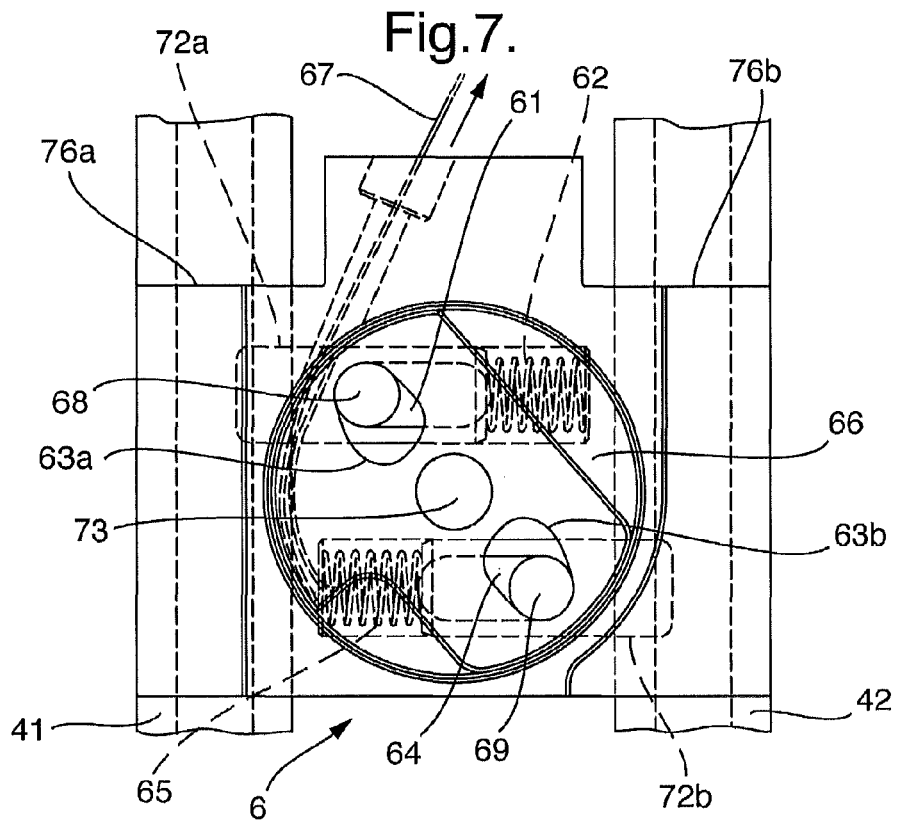
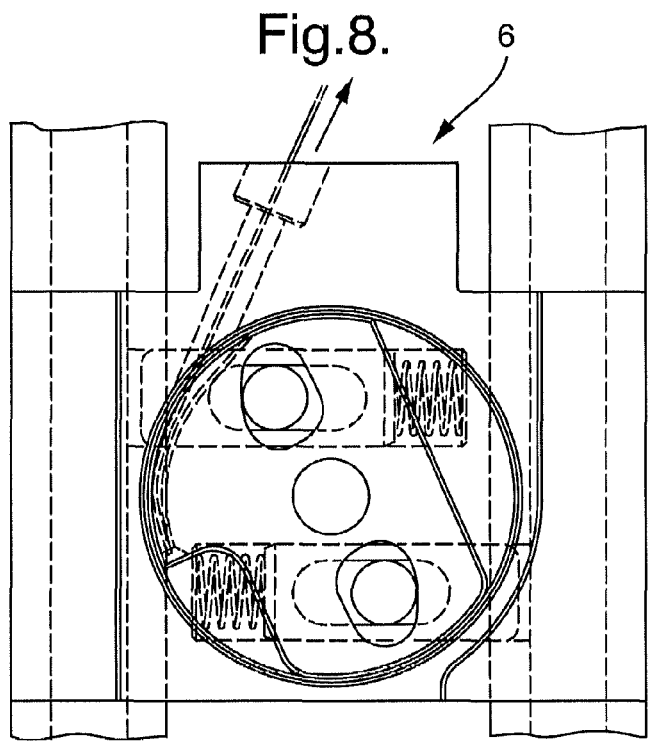

VEHICLE SEAT

The following invention relates to a seat for a vehicle and particularly but not exclusively to a seat for installation in the turret of an armoured vehicle.

It is known to have a seat that is provided with its own shock absorption system for protecting its occupant from large and brief forces.

Such seats are used in military vehicles. In particular, such seats are used where the military vehicle has an armoured hull suitable for withstanding the force of a land mine, or other explosive munition, detonated underneath.

In general, seats having shock absorption systems do not tend to offer a great amount of variety with respect to how the seat may be configured to suit the varying requirements of the occupant over the course of a journey. Occupants are expected to sit at a single height, or within a narrow range of heights, for the duration of the journey, especially if the occupant intends to rely on the shock absorbing qualities of the seat.

For the majority of military vehicles, this does not represent a problem because over the course of a journey the occupants of the seats will indeed sit at generally the same height, or to use alternative language, the seat will generally have the same configuration, for the entire journey.

It is the intention of the present invention to mitigate at least one of the disadvantages of the prior art.

Accordingly, there is provided a seat for a vehicle, the seat comprising:

a support for attachment to an aspect of a vehicle;
a platform block for secure attachment to the support;
a seat element for accommodating an occupant; and
a suspension system connecting the seat element to the platform block, the suspension system comprising a resilient member, the resilient member having an equilibrium condition which the resilient member is biased to return to if it extends beyond or retracts below the equilibrium condition.

The provision of such a resilient member means that if the vehicle is subjected to a large upward impulse (e.g. as might be applied from below by an exploding mine) the resilient member can act to mitigate the effects of that impulse on an occupant by at least two mechanisms.

Firstly, the resilient member can act to lessen the acceleration which the occupant is subjected to as the vehicle accelerates upwards under the influence of the impulse. Such positive acceleration may be lessened on account of the suspension system tending to spread the impulse applied to the occupant (i.e. to the seat element) over time as the resilient member initially becomes compressed prior to overcoming the inertia of the seat element and occupant.

Secondly the resilient member can lessen the acceleration that the occupant is subjected to as the vehicle slams back down onto the ground when the impulse ceases. Such negative acceleration may be lessened by the tendency of the suspension system to initially extend as it breaks the fall of the occupant.

As such, improved performance can be achieved, particularly in comparison to shock absorbing seats that employ a sacrificial crumpling material that may only work once and may only absorb shock during a positive, or upward, acceleration.

As such the invention provides for a seat that can have such an improved performance so as to allow an occupant to be exposed to an impulse and yet return to their duties upon coming to rest in the seat.

The seat may be mounted on the suspension system such that the resilient member is displaced from the equilibrium condition by the weight of at least the seat element. For example, the seat may be mounted on top of the suspension system so that the resilient member is compressed and so retracted below its equilibrium condition whilst in general use.

Such a configuration can pre-load the resilient member to provide a beneficial initial condition should the seat need to be used to mitigate the accelerations induced by an upward impulse exerted on the vehicle.

The platform block may be attached to the support and moveable relative to the support and configurable to occupy a first position or a second position. The platform block may be suitable for secure attachment to the support when at either the first position or the second position. Such a seat allows the occupant to have either a first or a second sitting configuration and in both configurations have the effects of sudden impacts mitigated. In particular such a seat can mitigate the effects of a large but brief force applied to the vehicle by reducing the peak force applied through the seat element to the occupant and extending the duration of the force over a greater time interval.

Moreover, the seat allows this shock absorbing effect of the suspension system to be achieved when the seat is in two distinct configurations. Such distinct configurations could be a first and a second height. In the context of a turret, the first height may configure the seat such that the occupant is housed entirely inside the turret with the turret hatch closed and the second height may configure the seat such that the occupant is substantially within the turret but with enough of their head out of a partially opened turret hatch to observe the environment directly.

The seat element may comprise a first guide block attached to the support and able to slide along the support. The suspension system may connect to the seat element at the first guide block. The platform block may be attached to the support and operable to slide along the support. As such, the dynamic response of the seat is constrained and guided by the combined operation of the first guide block and the suspension system. By thus limiting the degrees of freedom of the seat's dynamic response, the seat can be configured to counteract the dangers of a particular threat. For example where the seat is for use in an armoured vehicle, a particular threat may be provided by land mines and so the seat may be configured such that it is only able to move relative to the vehicle directed perpendicular to the ground. With such a configuration impulses from landmines, which would tend to propel the vehicle upwards, may be mitigated.

A result of guiding the platform block along the supports is that the seat can tend to be reconfigured quickly using a linear actuator. Such a linear actuator may be provided between the support and the platform block and may have the form of a fluidic piston that is pressurized so that it may apply a force that is approximately equal to the combined weight of the seat and the occupant.

The platform block may comprise a first selectively deployable pin, capable of occupying a deployed configuration and a retracted configuration. The first pin may be deployable to engage with the support and thereby provide a secure attachment. The platform block may comprise a cam which engages with the first pin and which may be selectively configured into two conditions such that the first pin is deployed depending on the condition of the cam. The platform block may further comprise a resilient member attached to the first pin and biased to urge the first pin into a deployed configuration.

Under the action of the resilient member the first pin defaults to a deployed configuration and so the control of the platform block may require only one input per reconfiguration. That is to say in order to reconfigure the seat, the cam should be actuated to retract the pin but may then be expected to deploy automatically and thereby securely attach the platform block to the support.

The platform block may comprise a first selectively deployable pin and a second selectively deployable pin for engaging the support. The first and second pins may be deployable in substantially opposite directions to one another. Providing pins which deploy in opposite directions can tend to reduce the bending moments experienced at the pins. The first and second pins may be outwardly deployable to engage with the support. This can tend to provide a more robust seat, in respect of tolerance to twist, because such an arrangement will tend to call for a broader support. Such an arrangement would be an alternative to having first and second pins that are inwardly deployable, which form of arrangement could tend to provide a more compact seat insofar as both pins may be deployed into a common central support.

The cam may be provided with a first camming surface for engaging the first pin and a second camming surface for engaging the second pin. The first camming surface may be rotationally equivalent to the second camming surface about the axis of the cam. By providing a single cam that may actuate both pins, the seat may be reconfigured by actuating only that cam.

The seat may further comprise a cable connected to the cam at a point offset from the cam axis, the cable extending to the seat element such that a user may apply a force to the cable to select the condition of the cam and thereby select the configuration of the first pin. The first guide block may be mounted above the platform block such that in use, the suspension system tends to be under a compressive load. The first position and the second position of the platform block may be separated by a distance of 0.1 to 0.3 metres. A second guide block may be provided on the opposite side of the platform block to the first guide block. This enhances the stability of the seat as it provides at least three points at which the seat element is connected, either directly or indirectly (via the suspension system), to the support. In particular these points may be provided at the interfaces between the support and the first guide block, the second guide blocks and the platform block.

The support may comprise a first pole provided with anchor elements for attachment to a vehicle wall and a second pole provided with anchor elements for attachment to a vehicle wall. The first and second pole may be parallel to one another.

The seat element may be provided with a belt for securing the occupant.

So that the invention may be more clearly understood, at least one embodiment of the invention shall now be described with reference to the following figures of which:—

FIGS. 7, 8 and 9 show the action of a mechanism for securing the seat in a low or high position;

Figure 17:
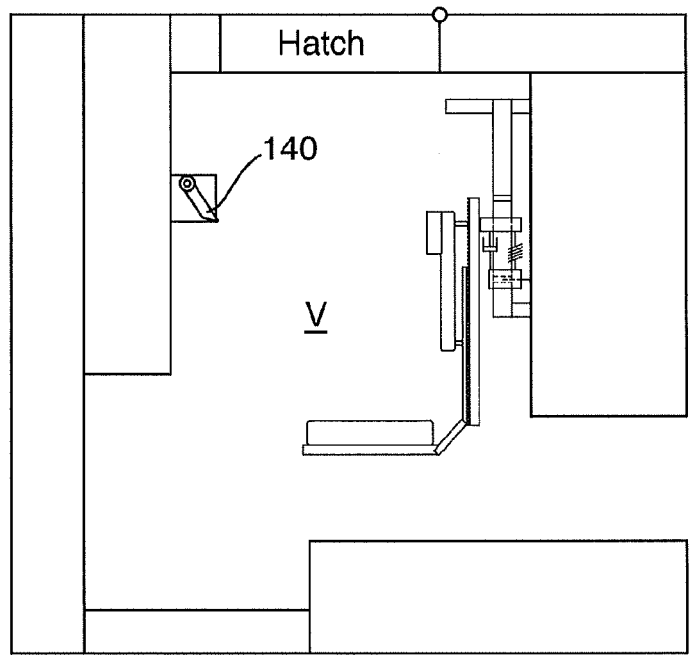
Figure 18:
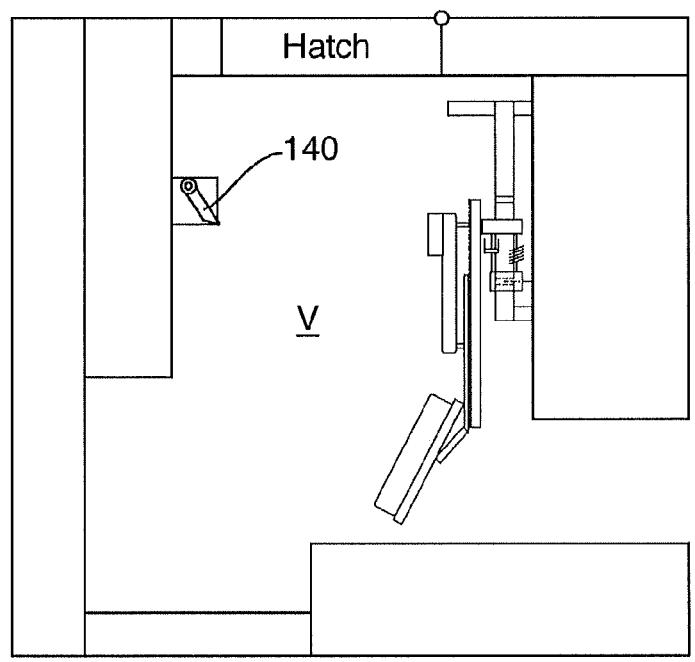
Figure 19:
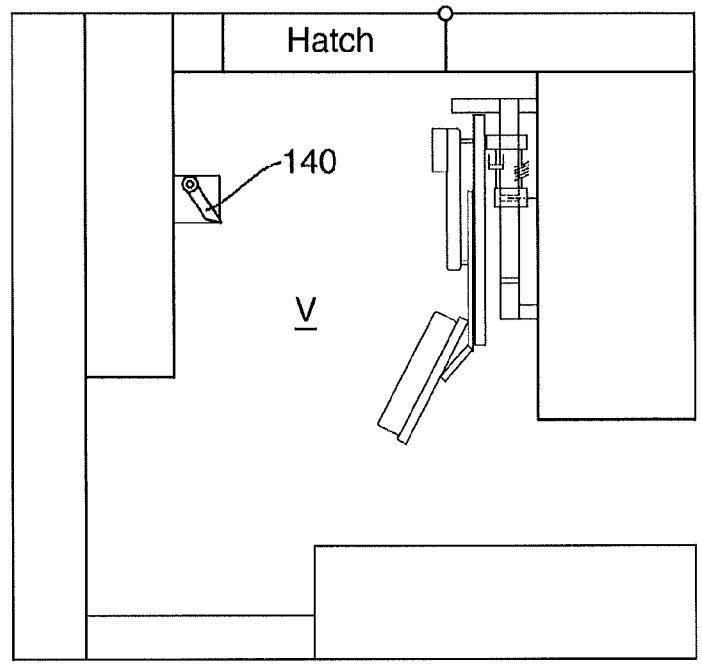
Figure 20:
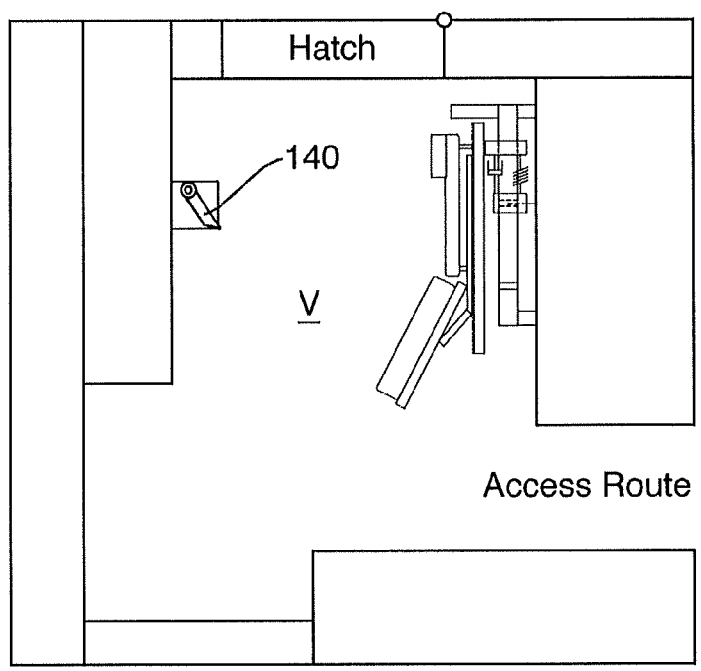
Figure 21:
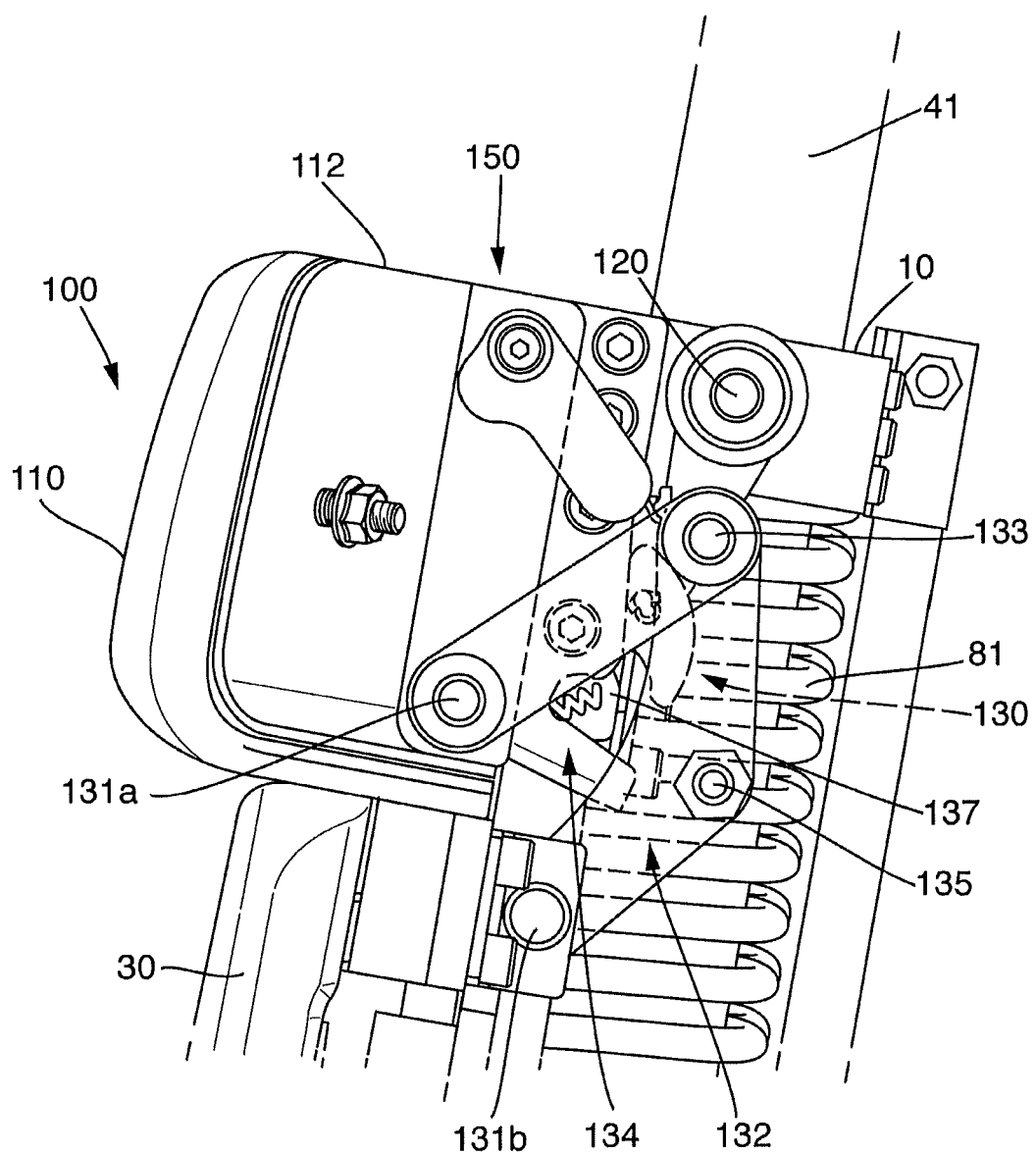
Figure 22:
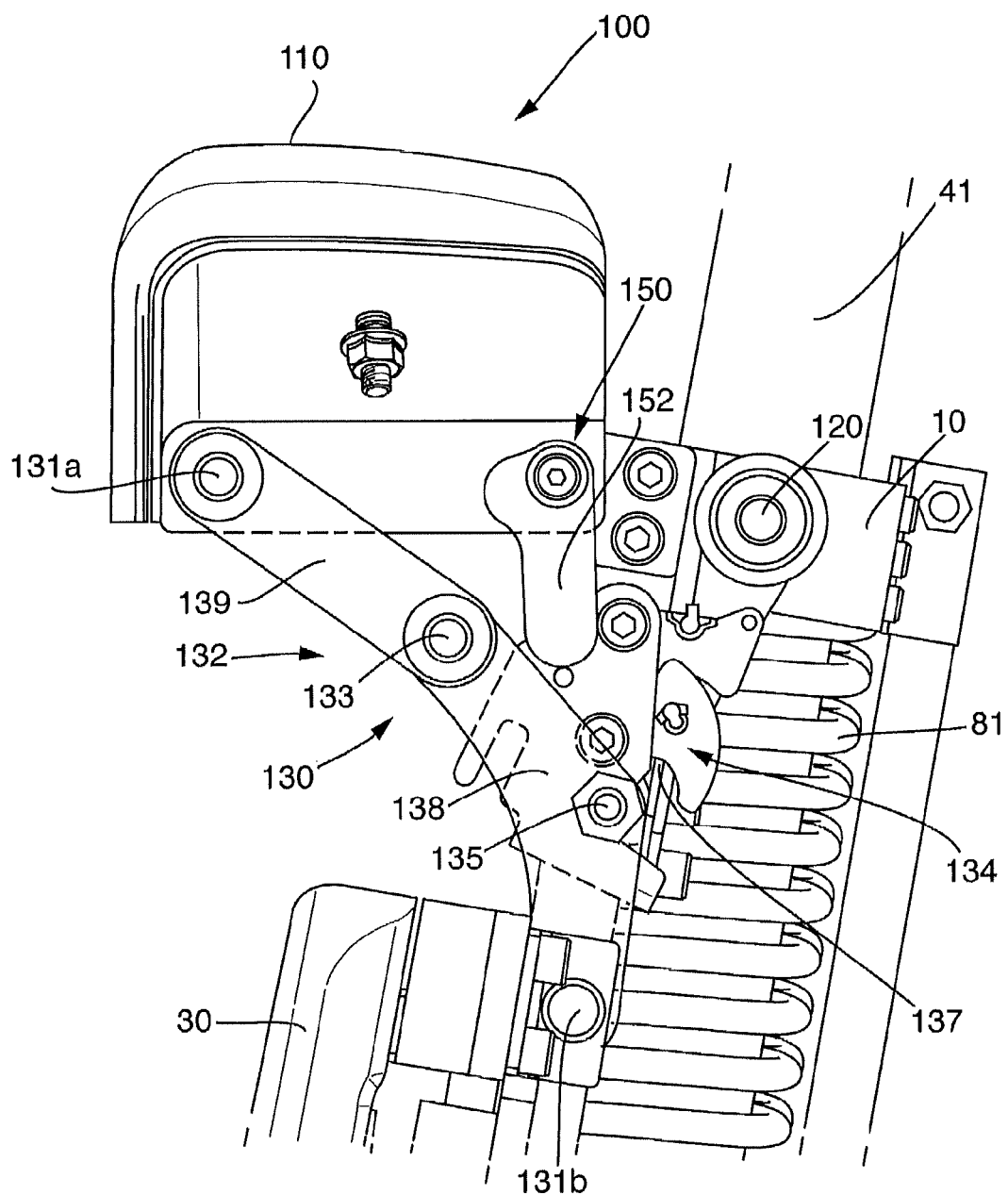

FIGS. 17 through to 20 show schematically a seat disposed in a confined space and further show the series of actions by which a seat may be reconfigured to enable occupant evacuation; and FIGS. 21 and 22 show a side aspect of a perch for use in the seat, the perch being shown configured in a flush and protruding condition respectively.

Throughout the following description, the location of components of the seat may be referred to as forwards, backwards, upwards or downwards. These terms are to be understood in the context of a seat that is arranged for use within a vehicle and which is arranged to face forwards in the vehicle. As such these terms will have the well known and accepted meaning that they do in the context of vehicles.

Figure 1:
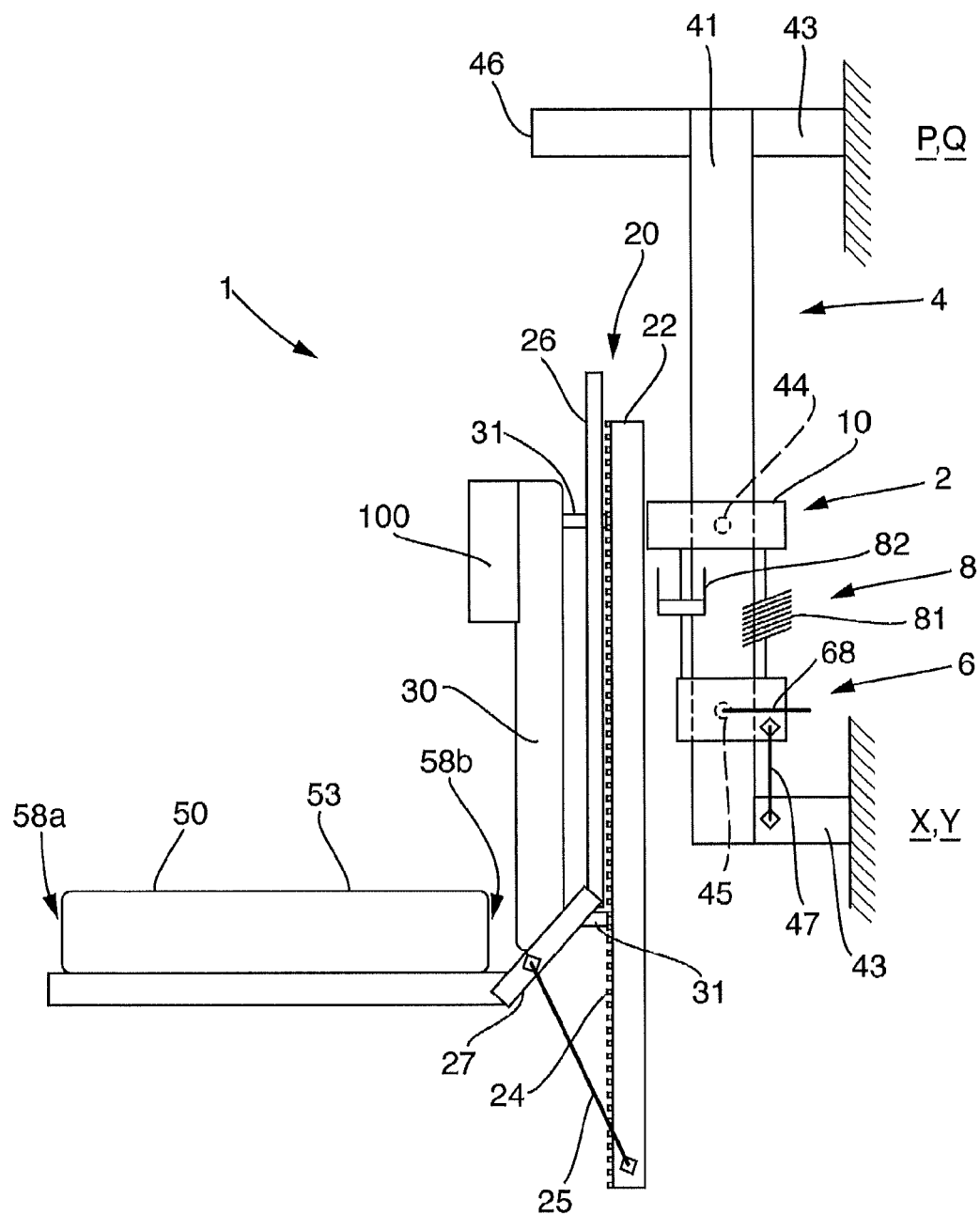
FIG. 1 shows a schematic representation of a seat for a vehicle as viewed from a side aspect, where the seat is configured for a shorter occupant to occupy a low position.
Figure 2:
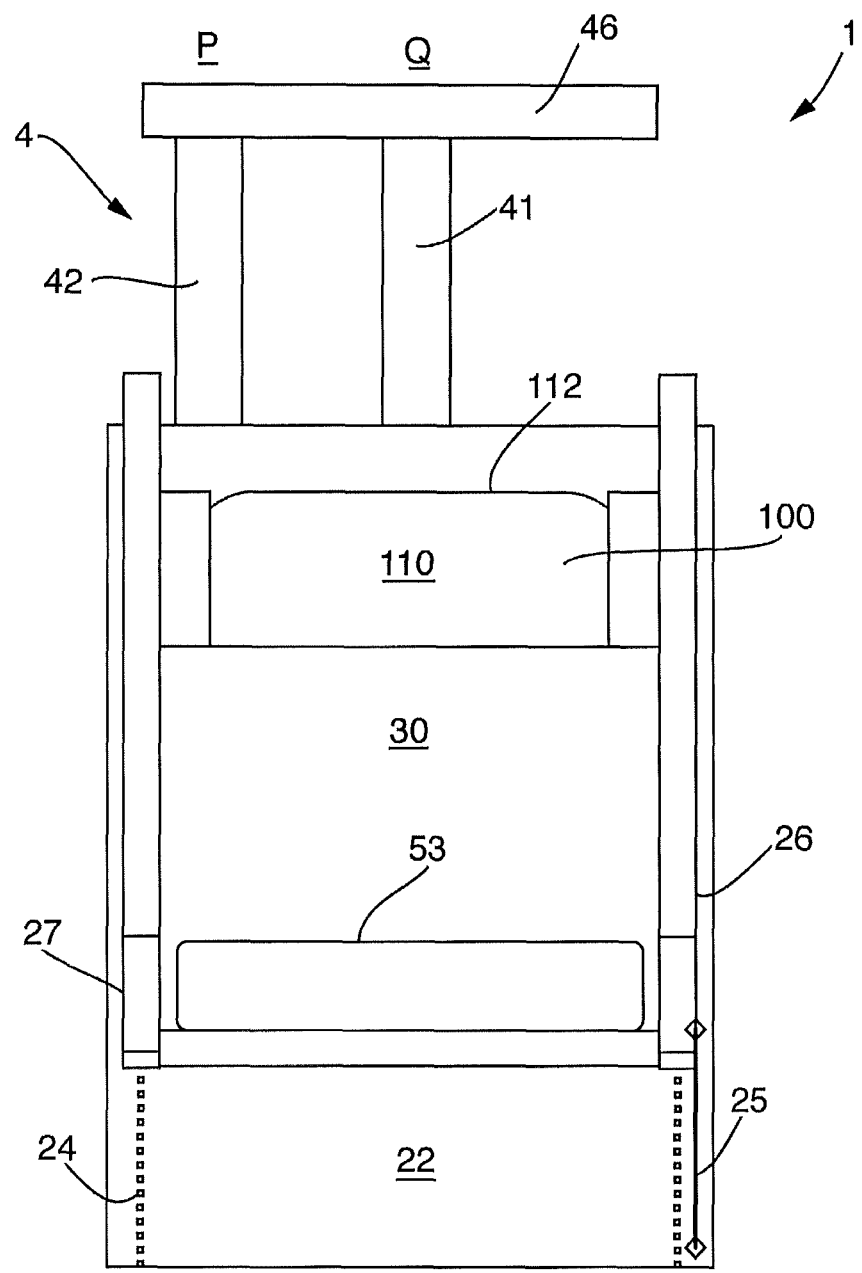
FIG. 2 shows a schematic representation of the seat of FIG. 1, when configured as in FIG. 1 and from a front aspect.

Nonetheless, it is further clarified what these terms mean with reference to FIG. 1 where the front of the seat is at the left hand side, the back is on the right, and the top of the seat is the part towards the top of the figure.

As may be seen from the figures, a seat 1 comprises a seat element 2, a support 4, a platform block 6 and a suspension system 8.

The support 4 comprises four anchors 43 which attach to a vehicle wall at four points P, Q, X and Y. The support 4 further comprises a first pole 41 which is fixed at a first end to the anchor 43 that is attached to the wall at point P and at the its other end to the anchor 43 that is attached to the wall at point X.

In addition the support 4 comprises a second pole 42, equivalent to the first pole 41 and extending between the anchors 43 at Q and Y.

The anchors 43 may be in the form of a bracket which is bolted or otherwise secured to the vehicle.

Vibration isolation bushes (not shown) are interposed between the poles 41, 42 and their respective anchors 43.

First pole 41 and second pole 42 are generally parallel to one another and are substantially perpendicular to the ground plane which a vehicle would be supported on.

A bottom recess 45, positioned towards the lower extremity of the pole 41, and having the form of a cylindrical bore, is provided in the first pole 41. An equivalent bottom recess 45 is provided in the second pole 42.

Further up the first pole 41 there is a top recess 44 having the same form and with an equivalent top recess 44 provided at the second pole 42.

For each of the first and second poles, the separation between the top recess and the bottom recess provided at that pole is approximately 0.2 m.

The platform block 6, or detent block, is arranged on the first and second poles 41, 42 such that it may slide along the length of the poles but is not free to move relative to the support in other ways. To this end the platform block 6 defines a first sleeve 76*a* for attachment to the first pole 41 and a second sleeve 76*b* for attachment to the second pole 42.

A first weight-opposing resilient member 47 connects the platform block 6 to a lower portion of the support 4. The first weight-opposing resilient member 47 is in the form of a pressurised hydraulic cylinder and that is biased to extend and thereby urge the platform block 6 to slide up the support 4. The first weight-opposing resilient member 47 is configured to exert a force that is slightly greater than the weight of the seat element 2.

As can be seen from FIGS. 5, 7, 8 and 9, positioned between the sleeves 76a and 76b of the platform block 6 and therefore between the poles 41 and 42, the platform block 6 is provided with a first pin 61 and a second pin 64 which are respectively biased by resilient pin-urging members 62 and 65 to protrude through apertures 72a and 72b at the sleeves 76a and 76b and onto the associated pole 41 or 42.

The pins 61 and 64 are dimensioned such that they may enter into the recesses 45, 44 provided in the poles 41, 42 when the platform block 6 is aligned with either the set of top recesses 44 or bottom recesses 45. The pins 61 and 64 enter the recesses and provide a sufficiently tight fit to transfer loads between pins 61, 64 and poles 41, 42 without permitting substantial wobble.

Each pin 61 and 64 is provided with a lug, 68 and 69 respectively, that extends perpendicularly from the pin axis (defined by the generally elongate form of the pin) and extends in a backwards direction. Each pin lug 68, 69 engages with an associated cam surface 63a, 63b in a common cam 66.

The first pin 61 is arranged above the second pin 64. Hence the first pin lug 68 and the associated cam surface 63a are arranged above the second pin lug 69 and the associated cam surface 63b. The cam 66 pivots about a joint 73 that is interposed midway between cam surface 63a and cam surface 63b.

The cam surface 63a has a form equivalent to the cam surface 63b. Both are surfaces defined by apertures within the cam 66. Conceptually, the cam surface 63a can be rotated 180° about the cam 66 pivot joint to substantially map onto the cam surface 63b.

A cable 67 is attached to a point on the cam 66 that is disposed towards a maximum distance on the cam 66 from the cam pivot joint 73.

As can be seen in the figures, the platform block 6 is connected to the seat element 2 by a suspension system 8. The suspension system 8 comprises a pair of helical springs 81, the first of which is arranged coaxially along and coiling around a portion of the first pole 41, the second of which is arranged coaxially along and coiling around a portion of the second pole 42. Each helical spring 81 connects the platform block 6 to the seat element 2. As an alternative to the helical spring 81, other forms of resilient member may be used such as hydraulic or pneumatic pistons.

The suspension system 8 further comprises a damper 82 in the form of a dashpot that connects the platform block 6 and the seat element 2.

To be more specific, the springs 81 and the damper 82 of the suspension system 8 connect to the seat element 2 at a first guide block 10.

The first guide block 10 is provided with a first sleeve for engaging with the first pole 41 and a second sleeve for engaging with the second pole 42. The interface between the sleeves and the poles is such that the first guide block 10 is permitted to slide lengthwise, that is to say axially, along the poles but is generally prevented from other forms of movement relative to the support 4.

Figure 14:
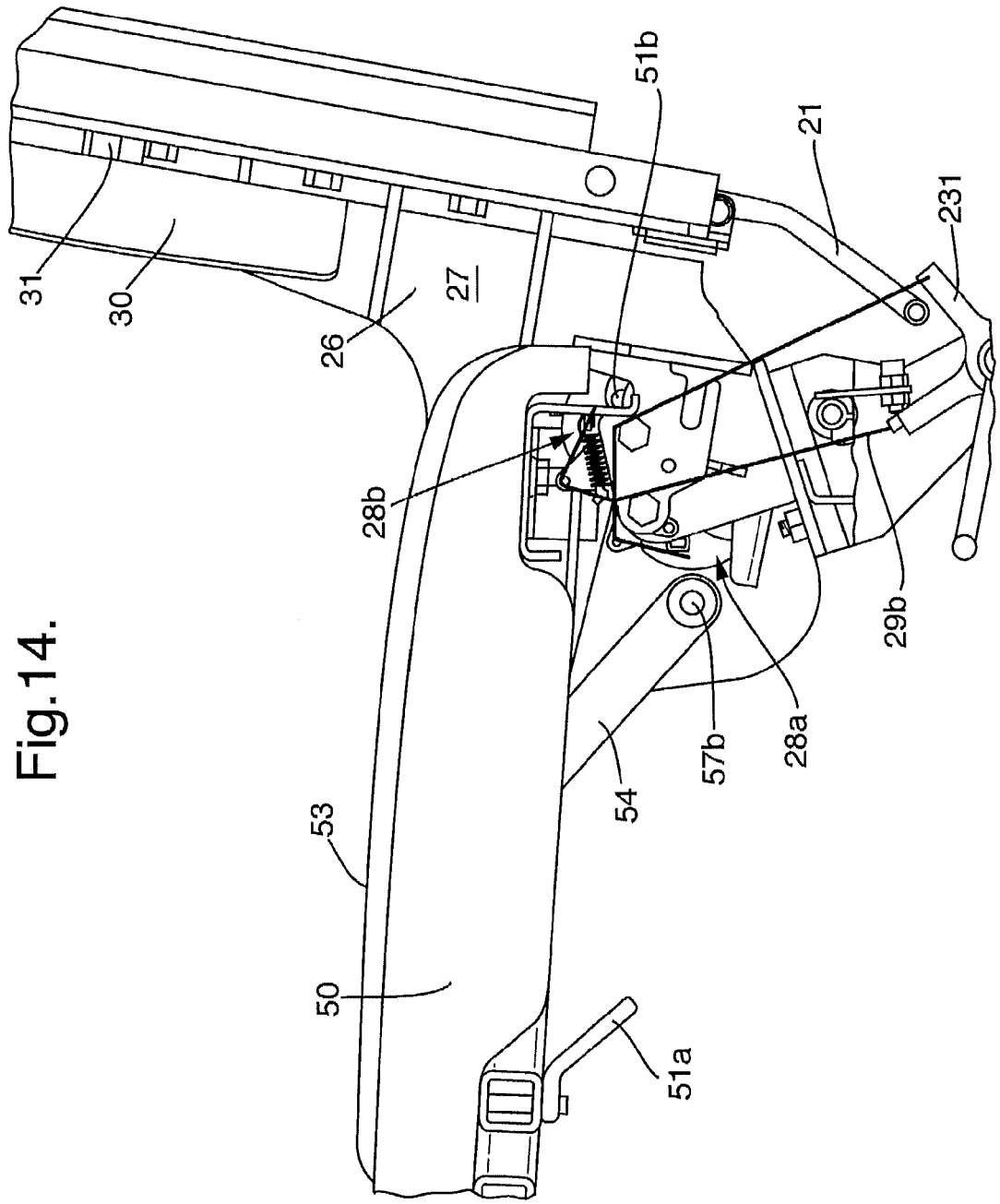
FIGS. 14 and 15 show cross sections through x-x of the seat as configured for seating and in a collapsed condition respectively.

At the seat element 2, the first guide block 10 is, in turn, connected to a seat chassis 20 that comprises a back frame 22, rails 24, a tray 26, a first latching gate 28a and a second latching gate 28b (FIG. 14).

The back frame 22 lies in a generally plate-like volume. The majority of the back frame 22 extends downwards from the connection to the first guide block 10 and a minority extends upwards. The back frame 22 is generally vertical and is arranged such that the plane it tends to define is substantially parallel with the plane that the pair of poles 41, 42 tend to define.

Figure 6:
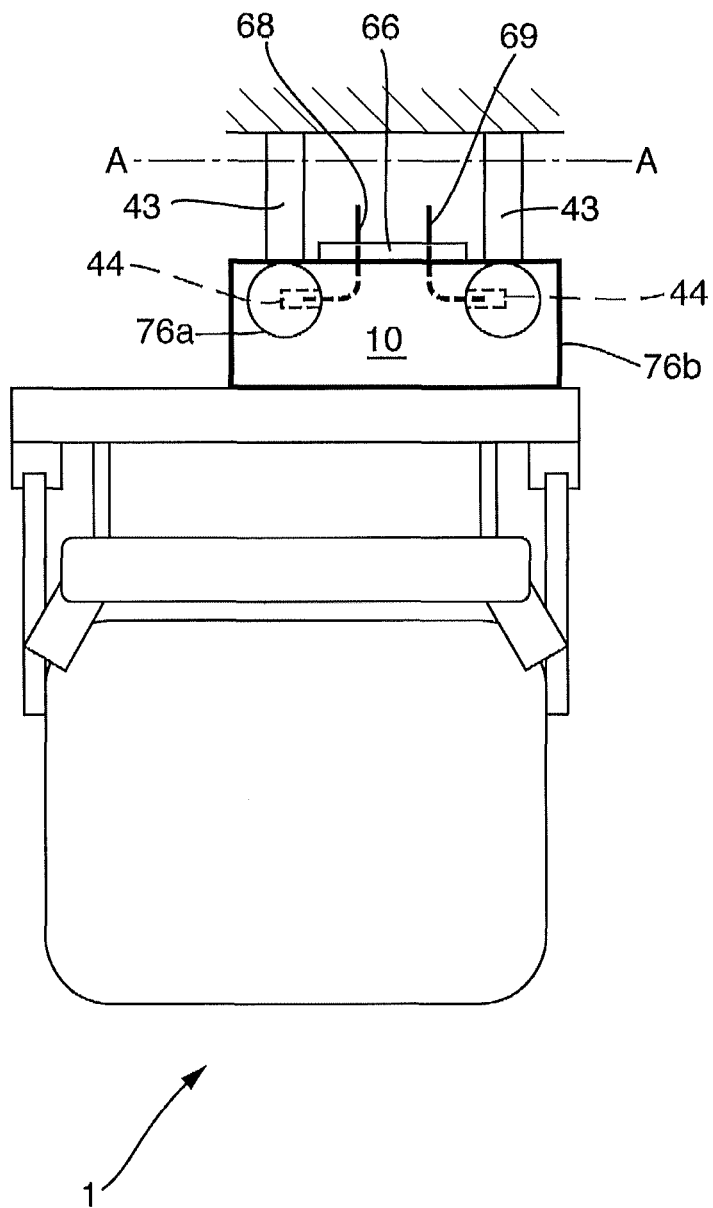

As can be appreciated from FIG. 6, the first guide block 10 does not connect at the lateral midpoint of the back frame 22 but is instead offset laterally. This provision can allow for the seat 1 to be set back further into the corner of a semicircular boundary (as might be defined where a pair of seats are provided in a turret).

The rails 24 are attached to the back frame 22 and mount the tray 26 at the back frame 22 such that the tray 26 can slide along the rails 24. The tray 26 and rails 24 are provided with a ratchet system 21 that permits the tray 26 to slide relative to the back frame 22 when the ratchet system 21 is actuated but secures the tray 26 at discrete points when the system is idle. A second weight-opposing resilient member 25 connects the tray 26 to a lower region of the back frame 22. The second weight-opposing resilient member 25 has the form of a pressurized cylinder and is biased to urge the tray 26 upwards along the rails 24 when the tray 26 is not secured by the ratchet system.

The tray 26 need not have a plate-like form. Indeed, and as shown in the figures, the tray 26 may include the form of a pair of runners, which do not connect directly to each other, and each of which engage with a respective rail 24.

The tray 26 is further provided with a pair of side panels 27. Each side panel 27 extends generally downwards and forwards from a lateral and lower extremity of the tray 26.

The side panels 27 are connected to a base member 50, which may alternatively be referred to as a seat pan. The base member 50 can lie flat in a generally horizontal plane, as such protruding forwards and providing a surface 53 onto which the occupant may sit directly down onto. In use, the weight of the occupant will therefore tend to pass through the base member 50 when the base member 50 is in a first condition.

Further connected to the back frame 22 are a set of beams 31 onto which beams 31 is mounted a back member 30. The beams 31 extend from a region of the back frame 22 that is between the rails 24 and protrudes forwards beyond the tray 26 to give a clearance between the back member 30 and the back frame 22 that is sufficient for the tray 26 to slide along the rails 24.

The back member 30 has the form of a panel and is provided with a cushioned aspect facing forwards so as to be able to accommodate an occupant's back and shoulders.

A headrest 46 for supporting the back of the occupant's head (and so as to mitigate the likelihood of injuries such as whiplash) extends from the support 4.

The base member 50 is connected to the side panels 27 of the tray 26 by an attachment 52. The attachment 52 is omitted from some of the schematic figures in the interests of simplifying these figures.

Figure 10:
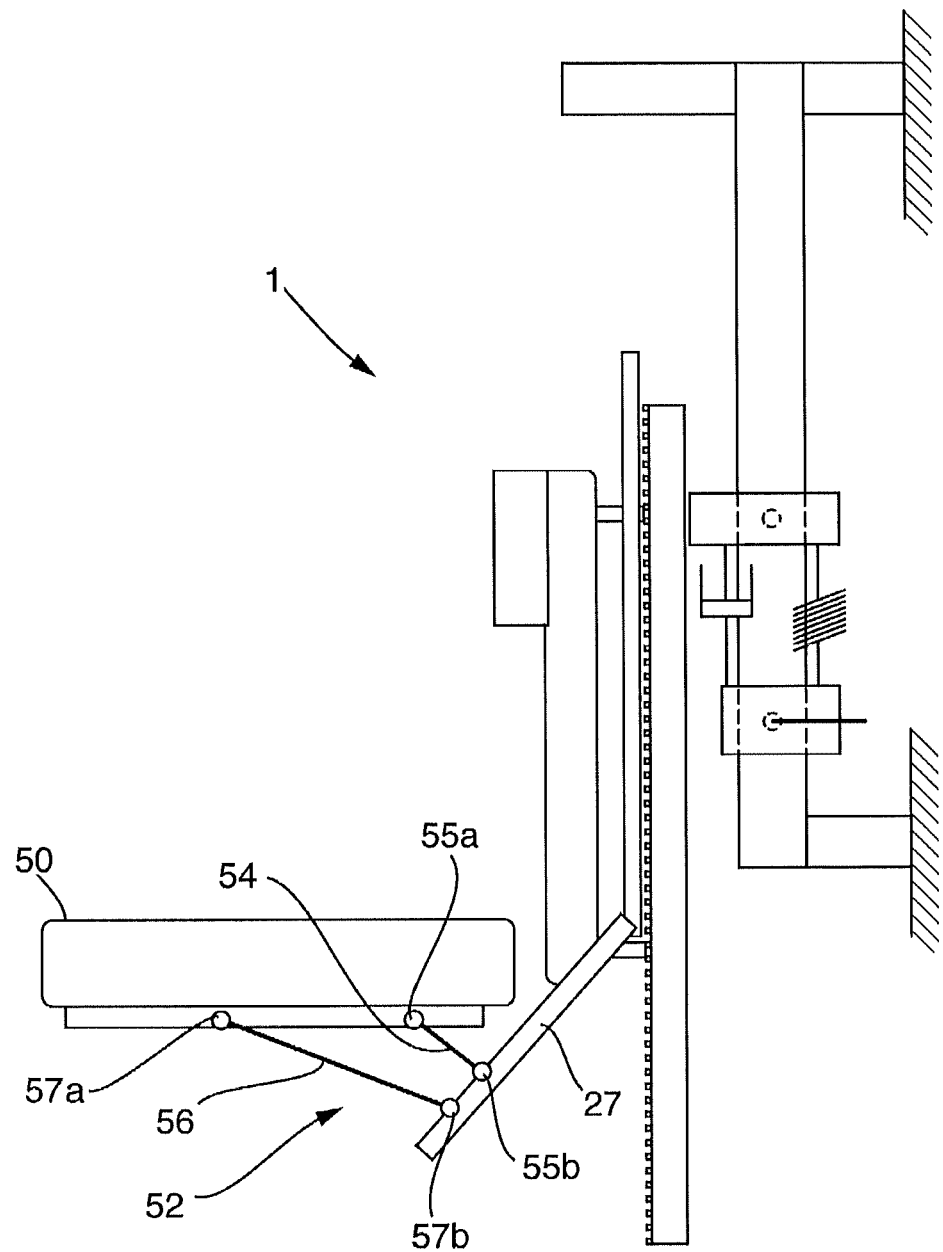
FIG. 10 shows a schematic representation of the seat with a particular representation of a seat collapse mechanism, viewed from a side aspect.

However as can be seen from, for example FIG. 10, the attachment 52 comprises a first link 54 extending between a first point at the side of the base member 50 and a first point on the side panel 27. The first link 54 is coupled to the base member 50 at the first point by a pivot joint 55a and is coupled to the side panel 27 by a pivot joint 55b.

A second link 56 in the attachment 52 extends between a second point at the side of the base member 50 and a second point on the side panel 27. Pivot joints 57a and 57b couple the second link 56 to the base member 50 and the side panel 27 respectively.

The pivot joint 57a is positioned forward of the pivot joint 55a when the base member 50 is in use and generally horizontal i.e. when the base member 50 is in a first condition. In such a condition, the pivot joint 57b is positioned on the side panel 27 forwards and downwards of the pivot joint 55b.

The configuration of the base member 50, the first link 54, the second link 56 and the side panel 27 provides a four bar linkage for reorienting the base member 50 relative to the side panel 27, and hence relative to the seat chassis 20.

Figure 11:
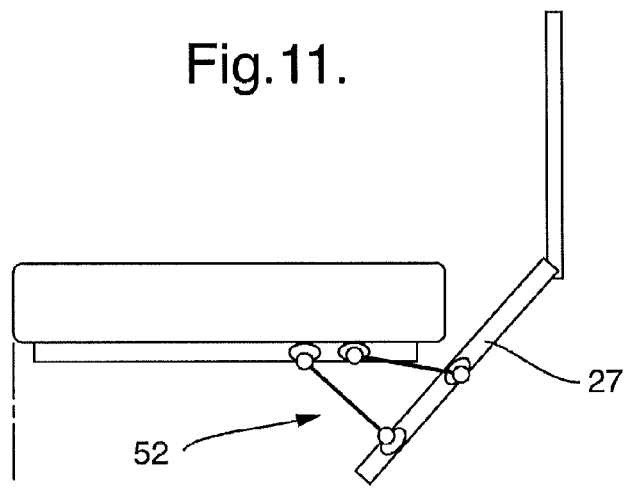
FIGS. 11, 12 and 13 show schematically how the seat as depicted in FIG. 10 may be configured into a collapsed condition.
Figure 12:
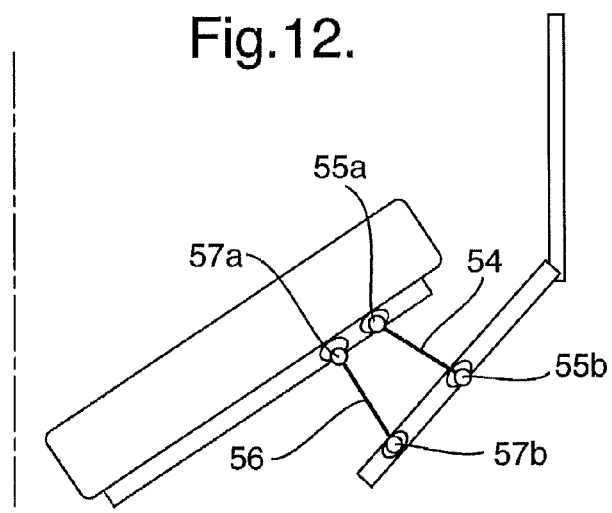
Figure 13:
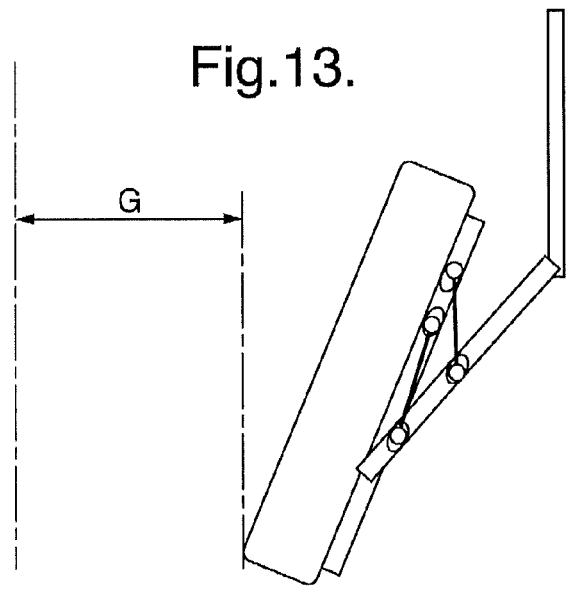
Figure 15:
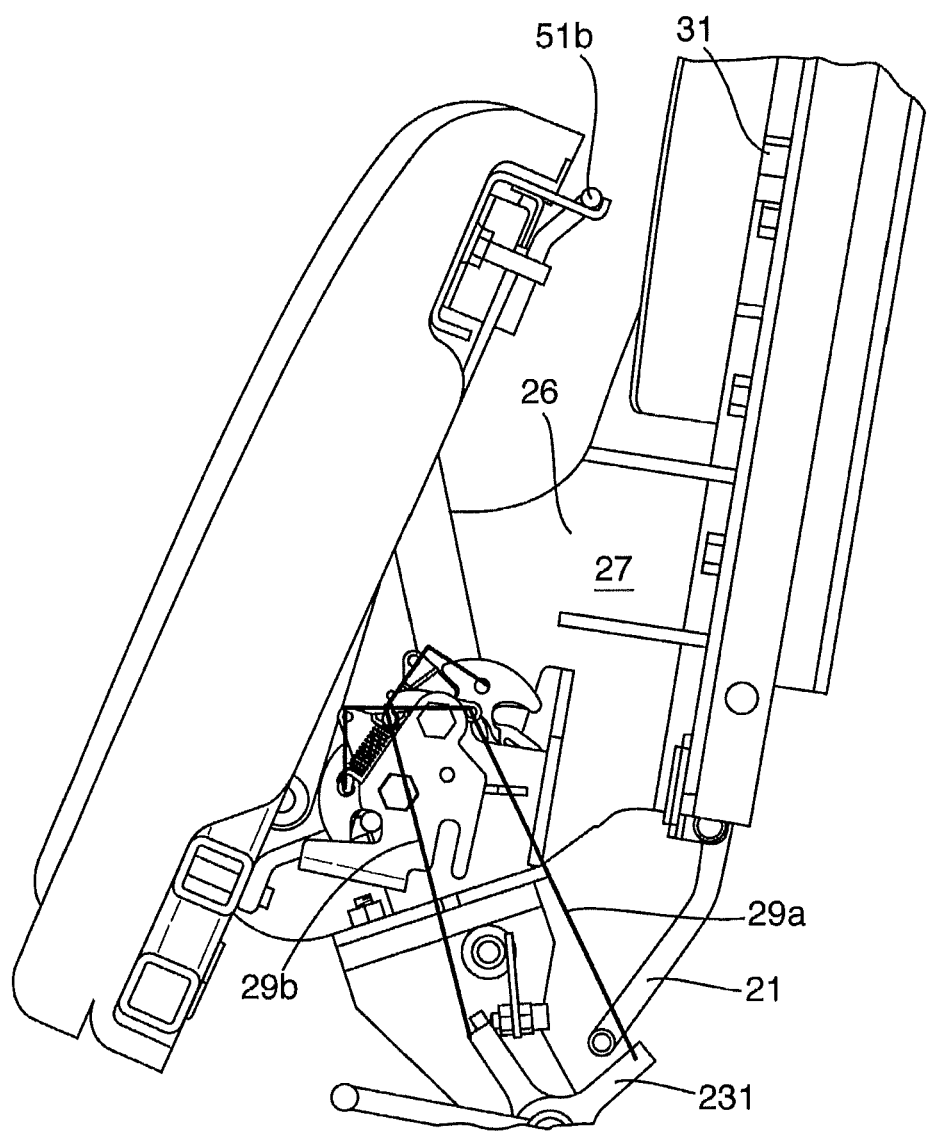

Specifically, the four bar linkage effects the transition of the base member 50 between two conditions. In the first condition, alternatively referred to as a 'sit-on' condition, and as shown in for example FIGS. 11 and 14, the base member 50 is generally horizontal and perpendicular to the back member 30 with a front end 58a protruding furthest forward and a back end 58b disposed closest to the back member 30. In the second condition, alternatively referred to as a 'slide-down' condition, and as shown for example in FIGS. 13 and 15, the base member 50 approximates to being generally parallel with the back member 30 and with the front end 58a tipped below the back end 58b. In the second condition, relative to the first condition, the back end 58b is raised.

A second four bar linkage which is equivalent to the first and which is hidden from view in FIG. 10, is provided on the opposite side of the seat 1 and connects the opposite lateral edge of the base member 50 to the opposite side panel 27.

Figure 16:
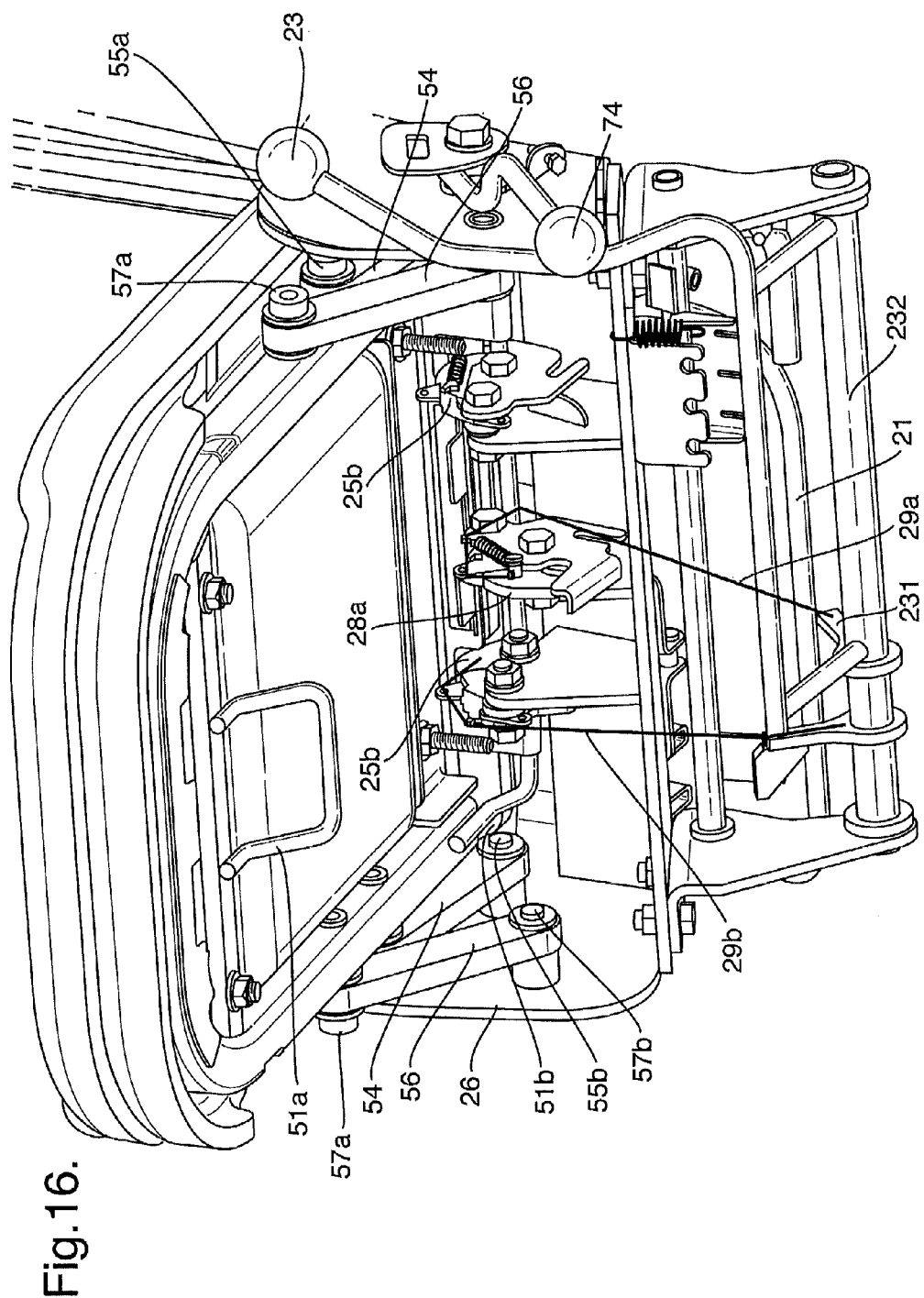
FIG. 16 shows a three dimensional representation of the seat, viewed substantially from an aspect underneath the seat.

At the underside of the base member 50 there is provided a first latching bar 51a and a second latching bar 51b. The latching bars 51a and 51b are clearly visible in FIGS. 14, 15 and 16.

The first latching bar 51a is located towards the front of the underside of the base member 50 and may connect to a first latching gate 28a when the base member 50 is in the second condition.

The second latching bar 51b is located towards the back of the underside of the base member 50 and may connect to a second latching gate 28b when the base member is in the first condition.

The first and second latching gates 28a, 28b are mounted at the seat chassis, at a portion of the tray 26 that extends down behind the base member 50 to approximately the same height as the side panel pivots 55b and 57b of the four bar linkage. The gates 28a and 28b are at generally the same height but are spaced apart laterally along the tray 26.

Each latching gate 28b, 28b has a form equivalent to an automotive door latch. As such each latching gate comprises, firstly, a resiliently pivoted crescent member that has a camming surface along its convex and external-facing side, and, secondly, a static member that cooperates with the concave side of the crescent member to define a trap when the crescent member is in its equilibrium position. A bar or pin may become trapped within the latching gate by being pushed against the camming surface of the crescent member, which pushing lifts the crescent member to permit entry to the trap. Once in the trap, the crescent member closes to secure the pin.

An actuator, such as a Bowden cable may be attached to the crescent member so as to enable selective application of a force that tends to open the trap and thereby allow the pin or bar to escape.

Accordingly, a first and second cable 29a and 29b, such as a Bowden cable, is associated with the first and second latching gates 28a and 28b respectively, each cable 29a and 29b extending between the latching gate and a lever 23 that is mounted at a location on the seat 1 that is convenient for the occupant to access.

The seat 1 further comprises a perch member 100.

The perch member 100 may be configured into a first 'as seat' condition (FIG. 22) or into a second 'as shoulder rest' condition (FIG. 21). The perch member 100 comprises an occupant accommodating face 110, a pivot joint 120, a fastening 130, a switch 140 and a second fastening 150.

The pivot joint 120 connects the perch member 100 to the back frame 22 of the seat chassis 2. In particular, the pivot joint 120 connects to the top edge of the perch member 100 so that in the absence of other factors, and with the seat disposed in an upright condition, the perch member 100 would tend to hang down from the pivot with the back of the perch resting on the back frame 22 and with the occupant accommodating face 110 generally flush with the equivalent face on the back member 30 (FIG. 21). In such embodiments, the entire surface 110 may be in contact with the shoulders of the occupant whilst in the second 'as shoulder rest' condition.

In certain alternative embodiments of the perch member 100, the pivot 120 may connect to the perch member 100 at a lower height such that in the first 'as seat' condition (FIG. 22), only a lower section of the occupant accommodating face can be in contact with the occupant. The seat should be adapted such that the portion of the perch member which is above the pivot can be accommodated in the 'as seat' condition.

The fastening 130 is provided to ensure that the perch member 100 may be secured whilst in the first condition. The fastening 130 comprises a linkage 132 and a latch mechanism 134. The linkage 132 is in the form of a two bar linkage and extends from a fastening pivot joint 131a at the bottom edge of the perch member 130 to a fastening pivot joint 131b at the back frame 22 and below the pivot joint 120.

A first link 138 of the linkage 132 extends from the fastening pivot joint 131b at the back frame 22 to an intermediate pivot 133. A second link 139 of the linkage 132 extends from the intermediate pivot 133 to the fastening pivot joint 131a at the perch member 100. A pin 135 extends laterally from a midpoint on the first link 138 of the linkage 132 and is configured to engage a latching gate 137 so as to lock the perch member 100 in place as it moves into the 'as seat' condition. The gate 137 is mounted at the seat chassis 2.

When the perch member 100 is in the first condition, the linkage 132 is fully extended with the effective angle (i.e. the angle subtended by a line drawn between the pivots 131a, 133 of the first link 138 and a line drawn between the pivots 133, 131b of the second link 139) between the first 138 and second 139 link being approximately 135°. As such the pivots of the linkage 132 are not collinear (i.e. their axes of rotation are not in the same plane) and so the linkage 132 can have a tendency to collapse.

When the perch member 100 is in the second condition, the linkage 132 is folded with the smaller effective angle between the first 138 and second 139 link being approximately 45°.

The gate 137 is also of a form equivalent to automotive door latches, having a resilient crescent member and a trap defining member. The gate 137 is provided with a cable (not shown), such as a Bowden cable, for remotely releasing the pin 135 from the gate 137 and hence the perch member 100 from its secured 'as seat' condition. The cable extends from the latch 137 to a switch 140 (shown in FIGS. 17 to 20) which is configured so as to be conveniently actuated by the foot of the occupant whilst sitting on the 'as seat' condition perch member 100.

The second fastening 150 is provided to ensure that the perch member 100 may be secured whilst in the second 'as shoulder rest' condition. The second fastening 150 has the form of a pivoted chock 152 that hangs about an axis generally coincident with the axis defined by the pivot joint 120. In the second condition, the form and the mass distribution of the chock 152 are such that the chock 152 hangs in a stable position and abuts the intermediate pivot 133 so as to prevent forward movement of the intermediate pivot 133 and thus prevents extension of the linkage 132.

The pivoted chock 152 is free to rotate about its pivot axis and may be rotated and lifted manually over the intermediate pivot 133 to allow the perch member 100 to deploy into the first 'as seat' condition.

In operation, the height of the base member 50, relative to the support 4 may be significantly altered. Such significant alteration is achieved by varying the set of recesses, either top 44 or bottom 45, into which the pins 61, 64 of the platform block 6 are deployed.

Figure 3:
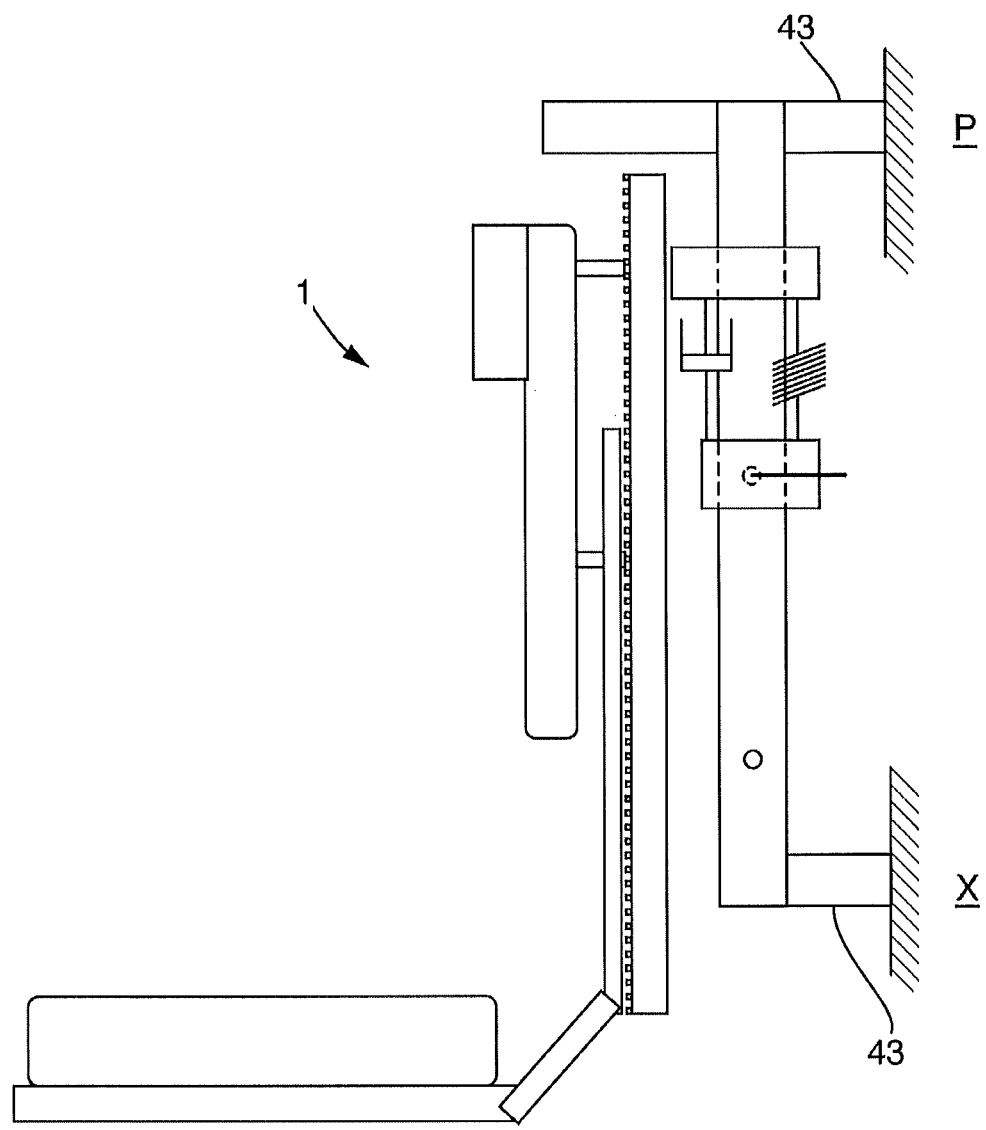
FIG. 3 shows schematically and from a side aspect the seat of FIG. 1 configured such that the occupant may occupy a high position.
Figure 4:
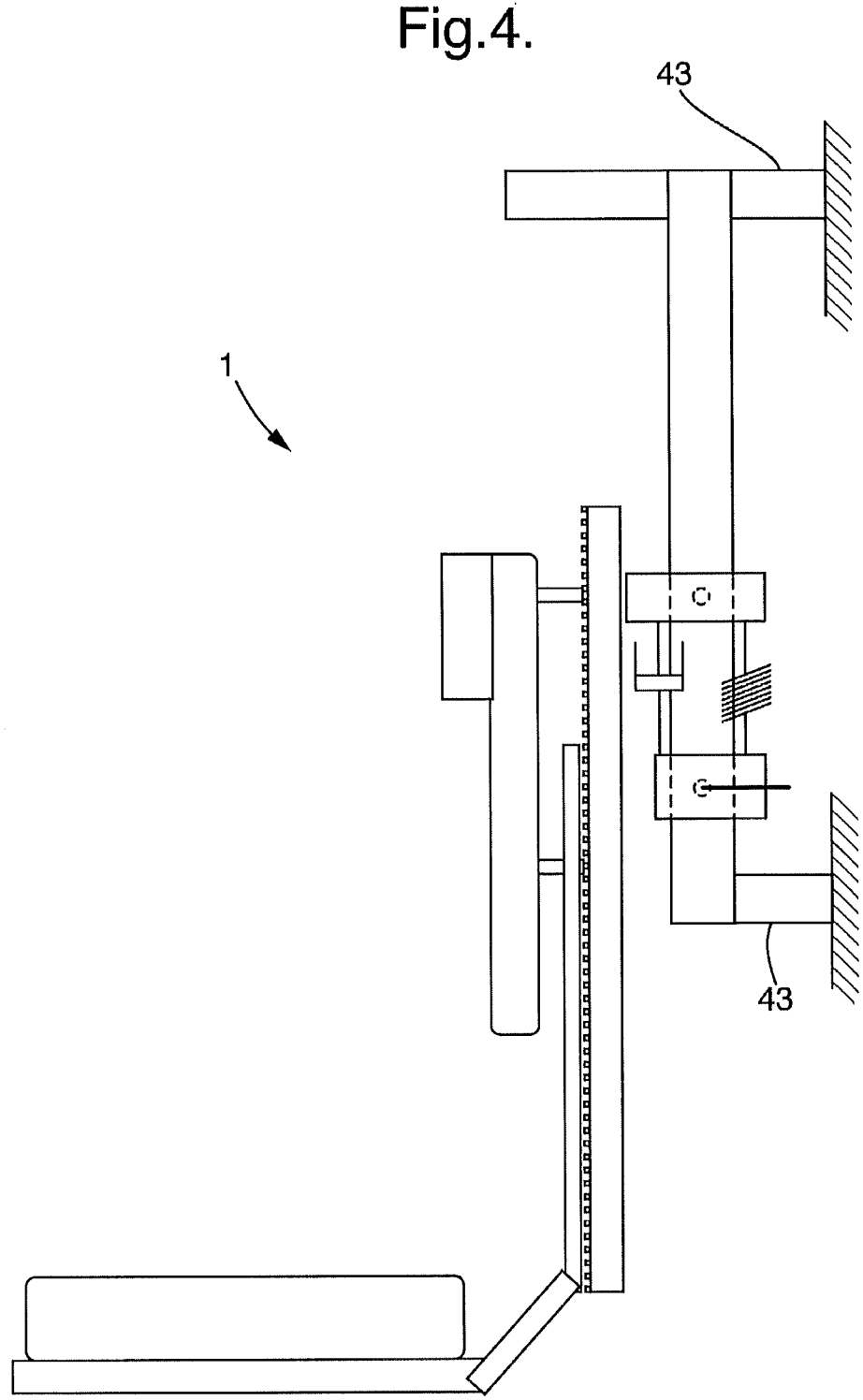
FIG. 4 shows schematically and from a side aspect the seat of FIG. 1 configured for a taller occupant to occupy a low position.
Figure 5:
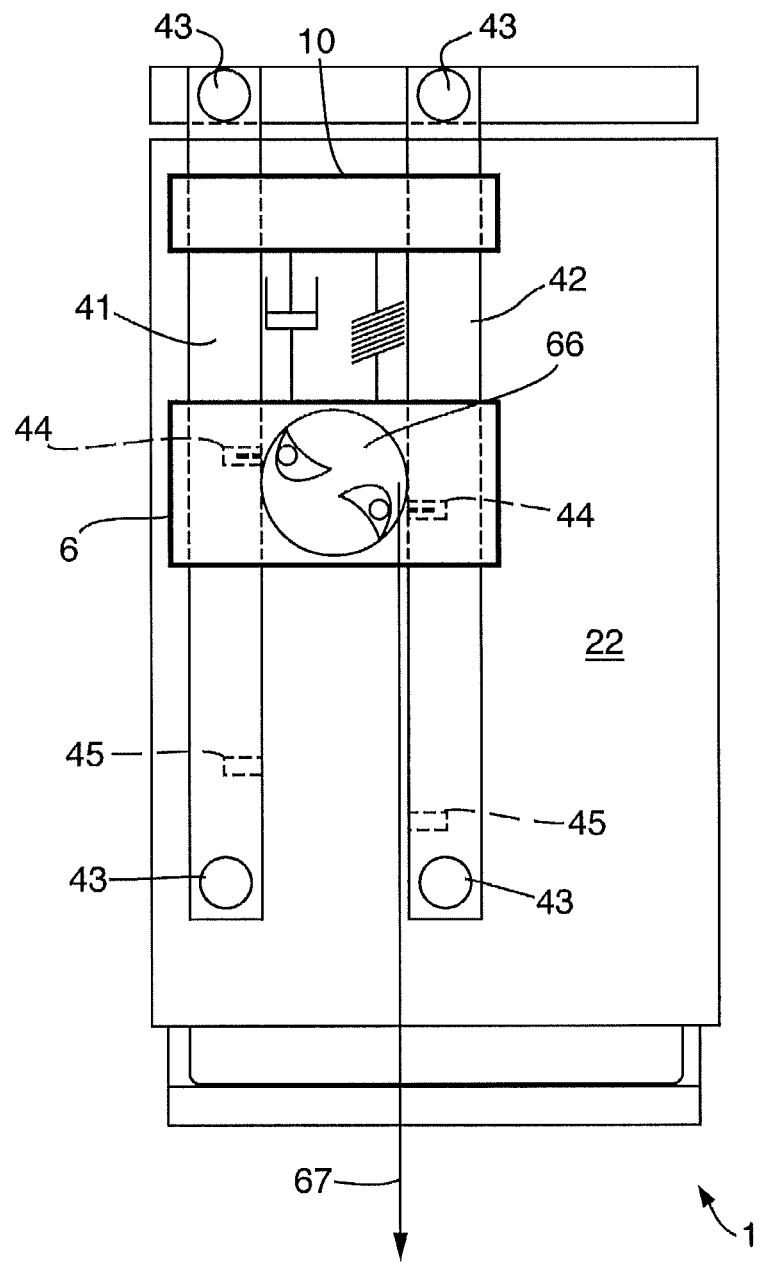
FIGS. 5 and 6 show the back aspect and top-down aspect respectively of the seat as configured in FIG. 3.

In particular, the height of the base member 50 may be altered from the low position as shown in FIG. 1 to the high position as shown in FIG. 3 as follows.

First the cable 67 is actuated by the occupant moving detent lever 74 so as to apply a force that may overcome the force exerted by the resilient pin-urging members 62 and 65 in the platform block 6. The application of such a force causes cam 66 to rotate clockwise.

Figure 9:
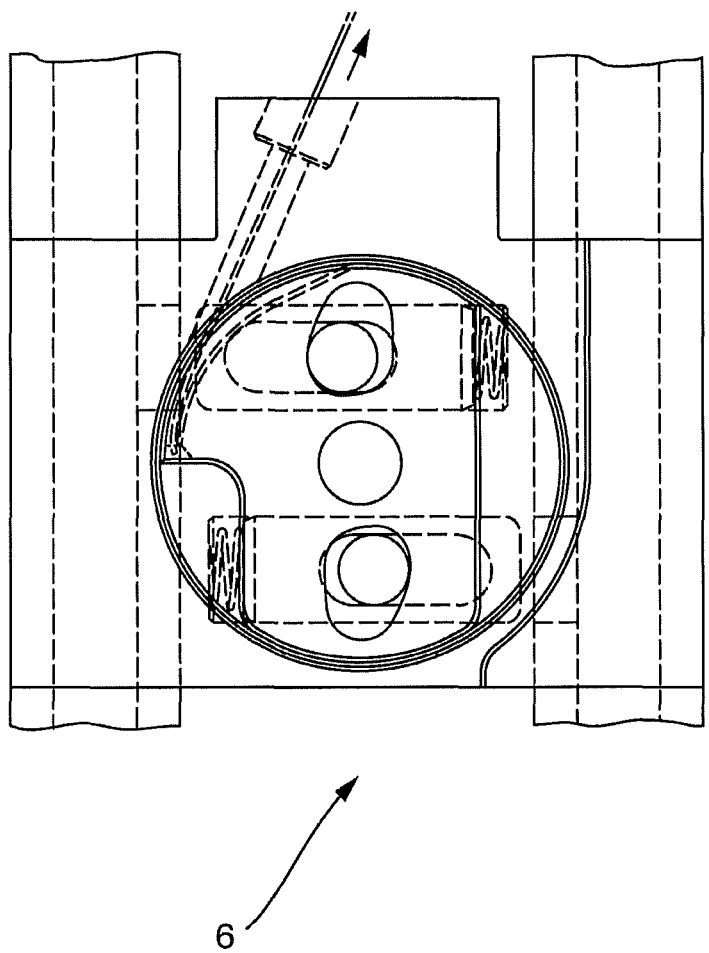

As shown in FIGS. 7, 8, and 9, as cam 66 rotates clockwise, the camming surfaces 63*a* and 63*b* act on the respective lugs 68, 69 of the pins 61 and 64 such that the pins 61 and 64 become withdrawn from the bottom recesses 45.

Once the pins 61 and 64 are withdrawn from their respective bottom recesses 45, the weight-opposing resilient member 47, which had previously been acting to urge the pins 61 and 64 into contact with the top walls of the bottom recesses 45, acts to urge the platform block 6 upwards along the poles 41 and 42. Thus a force for retracting the pins 61, 64 need be applied to the cable only for sufficient time to allow the weight-opposing resilient member 47 to propel the platform block 6 above the bottom recesses. After this time, the cable may be relaxed causing the pins 61, 64 to be urged back towards the poles 41, 42. However, with no recesses to accommodate the pins 61, 64, the platform block 6 will be permitted to slide over the poles.

As the weight-opposing resilient member 47 urges the platform block 6 upwards along the support 4, the whole seat element 2 and suspension system 8 is also raised. The weight-opposing resilient member 47 is configured to apply such a motive force until the platform block 6 arrives at the top recesses 44. The occupant will generally lift some or all of their weight off of the seat 1 during this process to permit the seat element 2 to move upwards.

Once the platform block 6 reaches the top recesses 44, the pins 61, 64 tend to be automatically deployed by their respective resilient pin-urging members 62, 65, thereby securing the platform block 6, and hence the seat 1, in the high position.

The seat 1 may return from the high position to the low position in a similar manner but with the difference that the occupant may remain seated and with their weight fully supported by the seat 1 over the course of the conversion. Indeed, the extra weight of the occupant, when combined with the weight of the seat components supported on the member 47, will tend to exceed the force applied by the member 47 and so the seat element 2 and its occupant will tend to fall down until the pins 61, 64 engage the bottom recesses 45.

In operation, the height at which the occupant sits may be finely adjusted by virtue of the ratcheted sliding that is permitted between the tray 26 and the back frame 22. A sliding upwards of the tray 26 is promoted by the weight-opposing resilient member 25 when the occupant removes some or all of their weight from the seat element 2 and the ratchet system is actuated. The ratchet system 21 is actuated when the occupant pulls tilt lever 23 backwards. This causes a cantilever member 231 on lever bar 232 to push on the lever bar of the ratchet mechanism 21, thus retracting a pawl (not shown) of the mechanism 21 so that the tray 26 becomes free to slide along the rails 24. Pulling the tilt lever 23 backwards also acts to open the first latching gate 28*a* but this has no particular effect as there is no bar trapped within this latching gate when the base member 50 is in the 'as seat' condition, which is the condition where the fine adjustments to the seat height will generally be made.

A sliding downwards is permitted by the weight-opposing resilient member 25 when the occupant sits on the seat element 2 and the ratchet system 21 is disengaged. The rails 24 guide the tray along the back frame 22 and provide a set of teeth which work in conjunction with a pawl (not shown) to secure the tray 26 at each position.

In operation, the perch member 100 may be secured in either the first condition or the second condition and may be converted from one condition to the other.

The perch member 100 is converted from the second condition to the first condition by manually moving the pivoted chock 152 so that it lifts above and out of contact with the intermediate joint 133 of the linkage 132. With the chock 152 thus held out of the way, the perch member 100 may be lifted up by rotating it about the pivot 133 so that bottom of the perch member 100 moves out of contact with the back frame 22 and continues until the perch member 100 is generally horizontal and in the first condition. Over the course of this conversion the linkage 132 extends so that the smaller effective angle between the links 138, 139 increases from approximately 45° to approximately 135°. Also, over the course of this conversion, the pin 135 extending laterally from the first link 138 engages and becomes trapped inside the latch 137. The trapped pin 135 secures the perch member 100 in the first condition by preventing rotation of the first link 138 about the back frame pivot 131*b*.

The perch member 100 is converted from the first condition to the second condition by releasing the pin 135 from the latch 137. The latch 137 releases the pin 135 by the application of a force to a cable (not shown), which may conveniently be done by the occupant kicking a switch 140 that is connected to the remote end of the cable (not shown).

Once the pin 135 is released from the latch 137, the first link 138 is free to rotate about the back frame pivot 131*b* and because the linkage pivots 131*a*, 131*b* and 133 are not collinear (i.e. their axes of rotation do not lie in the same plane) the linkage 132 tends to collapse. As such, the perch member 100 becomes free to pivot about the joint 120 back to the second position and tends to do so under the weight of the perch member 100 or under the combined weight of the perch member 100 and the occupant.

The arrangement of the perch member 100 and the seat 1 is such that as the perch member 100 rotates from the first condition orientation to the second condition orientation, any occupant sitting on the perch member 100 will drop down to the base member 50 but tend to have the impact of the fall onto the base member mitigated by the suspension system 8.

In operation the base member 50 may be converted from the first condition, or 'sit on' condition, to the second condition, or 'slide down' condition. Further the base member 50 may be converted back from the second condition to the first condition.

In order to convert the base member 50 from the first condition, the first latching bar 51*a* must be released from the first latching gate 28*a*. This may be done by pushing the tilt lever 23 forwards causing the lever bar to rotate and thereby pull on cable 29*a* so as to open the latch.

Upon release of the bar 51a, the base member 50 is free to move as the free link in a four bar linkage (that is to say that neither the base member 50 nor the pivots which connect to it are fixed to one particular location relative to the tray 26). In such a free state, the occupant may manually effect the conversion by pushing generally downwards on the front edge 58a of the base member 50. Such pushing tends to rotate the base member 50 about both the pivots 55a and 57a so as to raise the back end 58b of the base member 50 (with respect to the figures, this is an anticlockwise rotation of the base member 50). The rotation of the base member 50 and the associated raising at the back end 58b causes the first link to counter rotate (that is to say it rotates in the opposite direction to the base member 50, which is clockwise in the context of the figures). Such counter rotation tends to draw the pivots 55a and 55b higher and in towards the tray 26. Accordingly the base member 50, which is connected to the pivots 55a and 57a, is also drawn in towards the tray 26.

As the base member 50 arrives at the second condition, the first latching bar 51a engages with the first latching gate 28a and becomes trapped therein to secure the base member 50 in this condition. The surface 53 faces forwards.

The difference in forward protrusion, parameter G in the figures, is approximately 200 mm. 200 mm can relate to a significant amount of space in the turret of an armoured vehicle.

In order to convert the base member 50 from the raised condition to the as seat condition, the first latching bar 51a must first be released from the first latching gate 28a. Such release is done by pushing the tilt lever 23 backwards so that cable 29a is pulled to open the gate 28a.

Once released, the base member 50 may be pulled forwards and pushed downwards by the occupant. Such manoeuvring of the base member 50 rotates the base member 50 relative to the tray 26 (which rotation is clockwise in the context of the figures) whilst the links 138, 139 counter rotate (which counter rotation is anti-clockwise in the context of the figures). The counter rotation of the links 138, 139 tends to move the base member 50 forwards. Eventually, the rotation and translation of the base member 50 brings the second latching bar 51b into engagement with the second latching gate 28b.

When the seat 1 is disposed in certain confined volumes such as that denoted as V in FIGS. 17, 18, 19 and 20, the combined operation of the collapsible base member 50, the significantly alterable height of the seat element 2 and the fine height alteration ability of the tray 26, can provide an evacuation route from the confined volume V. In particular this evacuation route leads under the seat 1 and may be of particular benefit when it is not preferable to evacuate the confined volume V through a roof hatch (e.g. because the confined volume V is the turret of an armoured vehicle under hostile gunfire).

As shown in FIGS. 17, 18, 19 and 20, the combination of operations that provides this evacuation route, where initially the seat 1 is configured for seating the occupant within the confined area is as follows: i) the base member 50 is converted from the first condition to the second condition. Such a procedural step will inevitably result in the occupant no longer being seated on the seat 1 and the collapse of the base member 50 provides sufficient space forwards of the seat 1 to allow the seat element 2 to rise to the higher condition without obstruction from the non-sitting occupant. Accordingly, at step ii) the seat element 2 is converted to its higher position, see FIG. 19; and at step iii) the tray 26 is converted to its highest condition, see FIG. 20. A tunnel, provided behind the seat 1, is now accessible by the occupant.

The base member 50 is formed from a layer of high density energy absorbing foam interposed between a top layer of comfort foam (which provides the surface 53) and a bottom structural layer composed of a glass fibre spall liner.

The back member may be formed with a layer of comfort foam facing forwards and mounted on a backing layer made from glass fibre spall liner.

The major load-bearing structural components of the seat are composed from a material having appropriate properties. For example mild steel may be selected for the support, the platform block and the seat element. Where the seat is necessarily lightweight, aluminium, titanium or suitable alloys may be used in place of mild steel. Any combination of these materials may be used as appropriate.

The distance between the first and second position of the secured platform block may vary with the vehicle which the seat is intended for. Where the seat is intended for a turreted armoured vehicle, the first securable position of the platform block may be 200 mm to 500 mm below the second securable position.

The tray may travel between a lower height extremity and an upper height extremity, these extremities being approximately 200 mm apart so that a comprehensive anthropomorphic range of occupants may use the chair comfortably.

The weight opposing resilient members 47 and 25 can be in the form of gas struts.

The resilient member 81 may be in the form of a spring and should be calibrated according to suitable parameters. In particular, variable parameters such as the mass of the vehicle, the impulse from a blast, the pre-explosion loading of the member and the space available within the vehicle should be considered in calibrating the spring alongside parameters such as the limit of survivable human acceleration and the worst case scenario weight of an occupant.

Where the vehicle is estimated as having approximately a 30,000 kg mass and the impulse from the expected blast is approximately 100,000 Ns and the spring is pre-loaded to $3g$, the applicant has calculated that the spring should have a stroke of approximately 90 mm, should be preloaded to apply a force of approximately 4,000N and should apply a maximum force of approximately 13,000N.

As an alternative to the cables disclosed above as means for applying actuating forces at positions remote from the actuated components, the skilled man would understand that other forms of actuation would be possible. For example hydraulic actuation systems could be configured for releasing any of the pins and latching bars discussed above from their respective latching mechanisms.

As an alternative to the above configuration of the seat element to support interface where one guide block is provided, the seat element may be provided with a plurality of guide blocks. In connection with this alternative, the support poles may extend downwards to a greater extent and thereby allow space for the provision of a second guide block arranged to travel along the poles and below the platform block. The first and further guide block may each be fixed to the back frame and may be connected to each other.

As an alternative to the above configuration of the support poles, seat element and platform block (where the platform block is interposed between the poles and the pins deploy outwardly), the seat may be provided with a central support member that is surrounded by the platform block with the platform block being configured to promote deployment of the pins inwardly towards the single support member.

A specific example of the invention and various alternatives have been described, but a skilled man would upon reading the present description be enabled to generate further alternative embodiments of the invention without recourse to inventive activity and without departing from the scope of the invention.

The invention claimed is:

1. A seat for a vehicle, the seat comprising:
    a support;
    a platform block moveable between a first position and a second position relative to the support, the platform block configured to be secured to the support at each of the first and second positions;
    a seat element for accommodating an occupant; and
    a suspension system connecting the seat element to the platform block, the suspension system including an extendable and retractable resilient member having an equilibrium configuration which the resilient member is biased to return to while the resilient member extends beyond or retracts below the equilibrium configuration and while the platform block is secured in either one of the first and second positions.

2. A seat according to claim 1, wherein a weight of the seat element displaces the resilient member from the equilibrium configuration.

3. A seat according to claim 1, wherein the seat element comprises:
    a first guide block attached to the support and able to slide axially along the support, the suspension system connecting to the seat element at the first guide block, and wherein the platform block is attached to the support and operable to slide axially along the support.

4. A seat according to claim 3, wherein the first guide block is mounted at a distance from the platform block such that when in use, at least one of the first guide block and the platform block applies a compressive load to the suspension system.

5. A seat according to claim 3, comprising:
    a second guide block provided on an opposite side of the platform block to the first guide block.

6. A seat according to claim 1, wherein the platform block comprises:
    a first pin that moves between a deployed configuration and a refracted configuration, the first pin being deployable to engage with the support in the deployed configuration and thereby provide a secure attachment.

7. A seat according to claim 6, wherein the platform block comprises:
    a cam which engages with the first pin, the cam being operable to deploy the first pin.

8. A seat according to claim 7, wherein the platform block comprises:
    a second pin that moves between a deployed configuration and a refracted configuration, the second pin being deployable to engage with the support in the deployed configuration, wherein the first and second pins move in substantially opposite directions to one another when deployed.

9. A seat according to claim 8, wherein the first and second pins are outwardly deployable with respect to the platform block to engage with the support.

10. A seat according to claim 8, wherein the cam is provided with:
    a first camming surface for engaging the first pin; and
    a second camming surface for engaging the second pin, the first camming surface being opposite to the second camming surface about a rotational axis of the cam.

11. A seat according to claim 7, comprising:
    a cable connected to the cam at a point offset from a rotational axis of the cam, the cable extending to the seat element such that a user force applied to the cable causes the cam to rotate thereby moving the first pin.

12. A seat according to claim 6, wherein the platform block comprises:
    a resilient pin-urging member attached to the first pin and biased to urge the first pin into the deployed configuration.

13. A seat according to claim 1, wherein the first position and the second position of the platform block are separated by a distance of 0.1 to 0.3 metres.

14. A seat according to claim 1, wherein the support comprises:
    a first pole having anchor elements for attachment to a vehicle wall and a second pole having anchor elements for attachment to the vehicle wall, the first and second poles being parallel.

15. A seat according to claim 1, wherein the support is configured to be attached to a vehicle wall.

16. A vehicle seat comprising:
    a support structure having a longitudinal axis therethrough;
    a platform block mounted to the support structure and slidably movable along the longitudinal axis between a first position and a second position, the platform block configured to be secured to the support structure at each of the first and second positions;
    a seat element movable parallel to the longitudinal axis; and
    shock absorbing means coupled between the platform block and the seat element, the shock absorbing means being configured to attenuate the movement of the seat element resulting from:
        a first impulse applied to the seat element while the platform block is secured in the first position; and
        a second impulse applied to the seat element while the platform block is secured in the second position.

17. The vehicle seat of claim 16, wherein the shock absorbing means includes a resilient member.

18. The vehicle seat of claim 17, wherein the resilient member is movable between an extended position with respect to the platform block and a retracted position with respect to the platform block.

19. The vehicle seat of claim 18, wherein the resilient member has an equilibrium position between the extended and retracted positions, and wherein the resilient member is configured to return to the equilibrium position subsequent to a displacement therefrom.

20. The vehicle seat of claim 16, wherein the support structure is configured to be attached to a vehicle wall.

* * * * *